Nov. 5, 1940.  L. E. WARNER ET AL  2,220,306
GOVERNOR
Filed Jan. 17, 1939  3 Sheets-Sheet 1
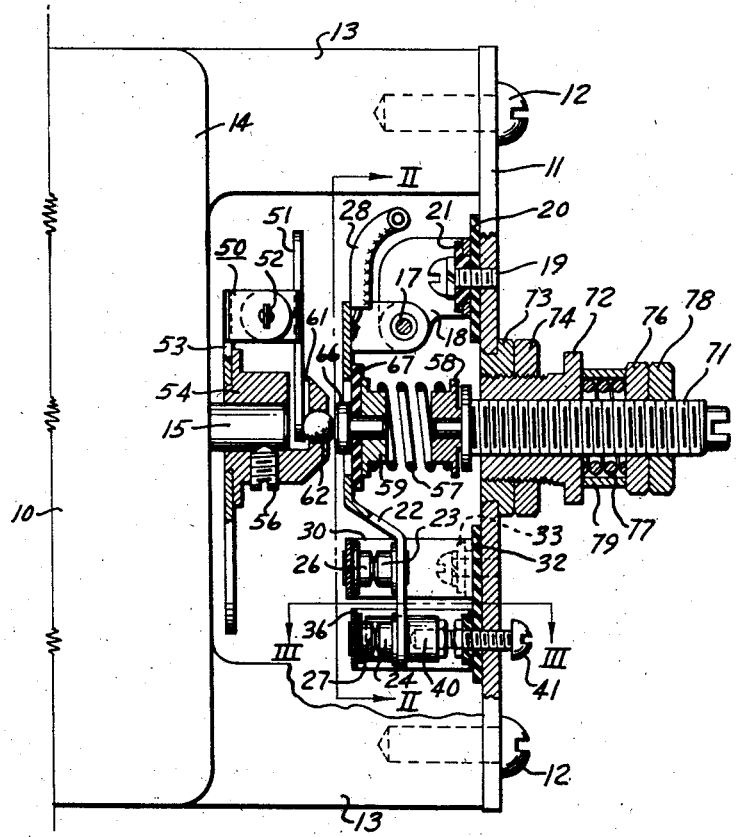
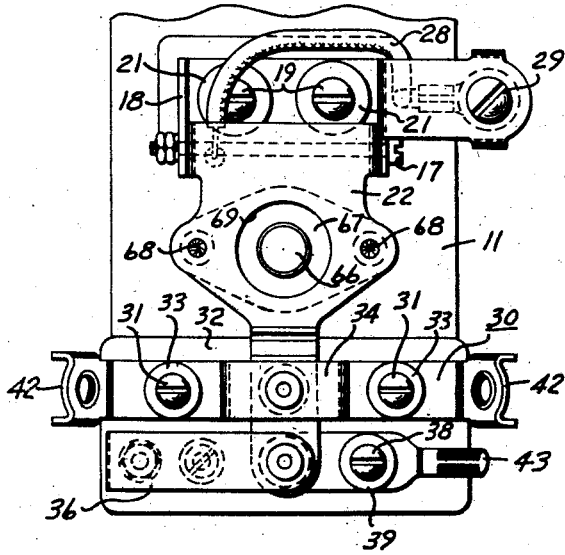
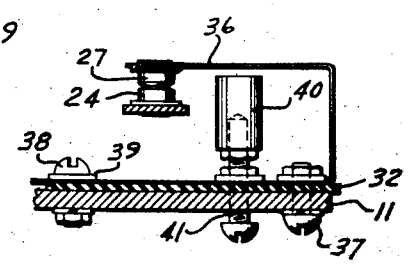
INVENTORS,
Lawrence E. Warner.
Harold T. Avery.
BY
ATTORNEY.

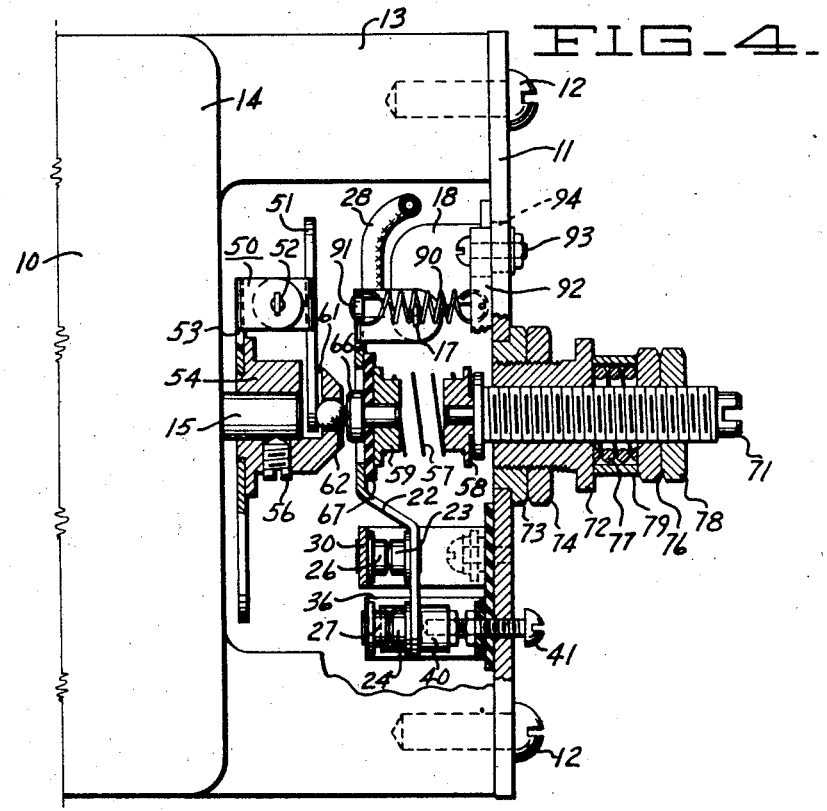
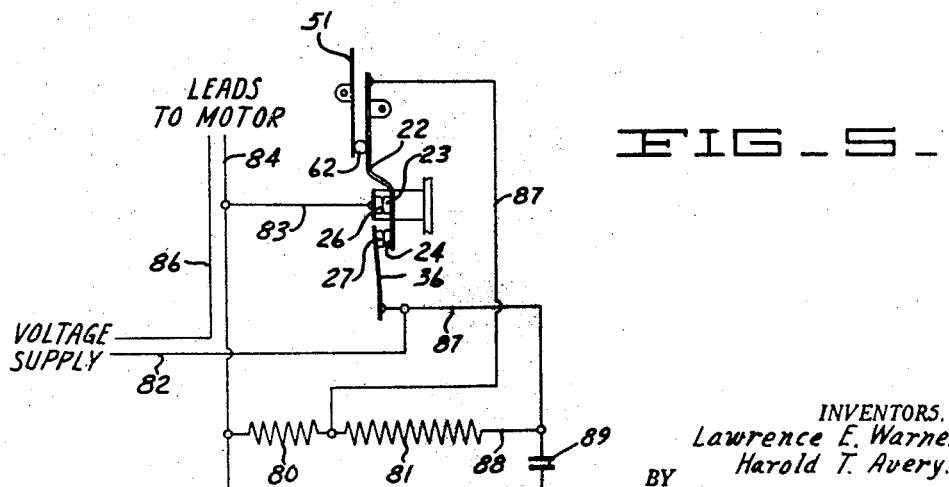

Nov. 5, 1940.   L. E. WARNER ET AL   2,220,306
GOVERNOR
Filed Jan. 17, 1939   3 Sheets-Sheet 3
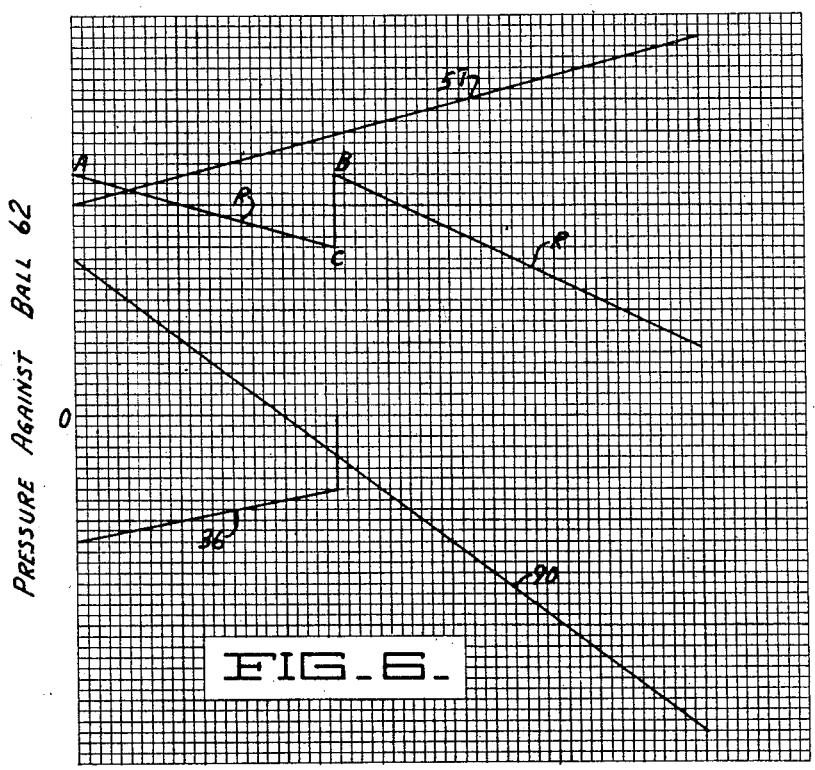
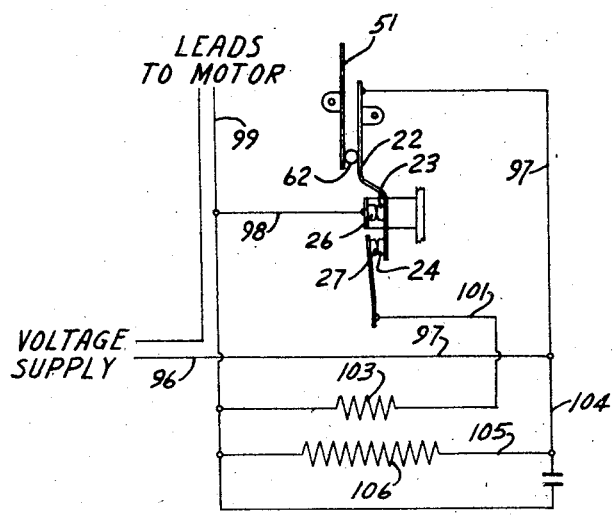
INVENTORS.
Lawrence E. Warner.
Harold T. Avery.
BY
ATTORNEY.

Patented Nov. 5, 1940

2,220,306

UNITED STATES PATENT OFFICE 2,220,306

GOVERNOR

Lawrence E. Warner and Harold T. Avery, Oakland, Calif., assignors to Marchant Calculating Machine Company, a corporation of California Application January 17, 1939, Serial No. 251,361

4 Claims. (Cl. 200—80)

The present invention relates to speed regulating devices and particularly to governors for electric motors.

Governors of the class to which the present invention relates comprise mechanism responsive to centrifugal force as the speed of the motor changes, to operate switching devices in the power supply circuit for increasing or decreasing the mean voltage supplied to the motor so that its speed is automatically maintained as nearly constant as possible regardless of changes in the driven load.

The principal object of the invention is to provide an improved governor of the class described which will maintain the motor in smooth operation at a predetermined speed although the driven load may vary over a wide range.

A further and important object in the invention is to improve governors of the class described by decreasing the voltage of the circuit or circuits made and broken in governing operations.

A further and important object in the invention is to improve governors of the class described by decreasing the amount of current passing through the circuit or circuits made and broken in governing operations.

A further and important object of the invention is to provide a governor of the class described in which the frequency of operation of the automatically operated switching devices will be substantially reduced, whereby the life of the contact points thereof will be extended.

A further object of the invention is to increase the range of motor loads over which governing devices of the class described will function efficiently, without introducing factors which will decrease the life of the contact points of the switching devices.

A further object of the invention is to increase the range of motor loads over which governing devices of the class described will function efficiently, without decreasing the accuracy with which the device will hold the motor to a desired speed.

The novel features characteristic of the invention are set forth with particularity in the appended claims. The invention itself, however, together with additional objects and advantages thereof, will be best understood from the following description of the specific embodiments thereof, when read in connection with the accompanying drawings, in which:

Figure 1 is a view in side elevation of a governor mechanism constructed in accordance with the present invention, certain parts being sectioned;

Figure 2 is a transverse sectional view taken substantially on the plane of line 2—2 of Figure 1;

Figure 3 is a fragmentary plane sectional view taken substantially on the plane of line 3—3 of Figure 1;

Figure 4 is a longitudinal sectional view similar to Figure 1, but showing a modified form of device embodying the invention;

Figure 5 is a schematic wiring diagram of the apparatus;

Figure 6 is a diagram showing the relative pressures that the various springs exert against ball 62 (Figure 4), with different angular positions of switch arm 22;

Figure 7 is a schematic wiring diagram, showing a modified arrangement of resistors.

In general, the present governor system comprises a plurality of electrical resistors which are adapted for connection into the supply circuit of an electric motor for decreasing the voltage supply to the motor, which resistors are successively connected into said circuit by means comprising a speed responsive device connected to the motor.

With reference more specifically to the arrangement disclosed in Figures 1 to 3 of the accompanying drawings, the present governor is adapted for use in conjunction with an electric motor 10, and comprises a mounting plate 11, secured by screws 12 to arms 13 integral with the motor, in spaced relation to an end 14 thereof, and in spaced relation to one end of the motor shaft 15 projecting through the end of the motor housing 10. Pivotally mounted on rod 17 in a bracket 18, fixed by screws 19 to the inner side of the plate 11, but insulated therefrom by plate 20 and bushing 21, is a switch arm 22, which extends across the line of the axis of the shaft 15 and is provided, adjacent its free end, with spaced contact points 23 and 24 adapted to engage contact members 26 and 27, respectively, as the arm 22 is swung on its pivot rod 17. Electrical connection with the switch arm 22 is preferably made, as here shown, by securing a flexible conductor 28 to the pivoted end of the switch arm, and to the bracket 18, which is provided with a lug 29 extending beyond plate 11 (Figure 2) for external connection.

The contact 26 is mounted upon a rigid bracket 30 secured to the inner side of the plate 11 by screws 31 passing through a strip 32 and bushings 33, similar to strip 20 and bushing 21, so that the bracket 30 is insulated from the plate

11. An intermediate portion 34 of the bracket is offset from the plate 11 so as to enclose the lower end of switch arm 22 between the offset portion and the inner side of the plate 11.

The contact 27, in contrast to the contact 26, is mounted on a resilient member, so that on counterclockwise movement of the arm 22, contacts 23 and 26 will disengage prior to disengagement of contacts 24 and 27. As here shown (Figure 3) the contact support 36 consists of a flat resilient strip of metal, or the like, which is of substantially U shape and is secured to the inner side of the plate 11 by screws 37 and 38 passing through strip 32 and bushings 39 by which it is insulated therefrom.

The resilience of the strip 36 is such that contact 27, secured to the free end of the strip, will resiliently press against and follow the contact element 24 on the arm 22, on movement of the arm away from the contact member. The movement of the contact support 36 is limited, however, by a stop 40, in the form of a block of insulation material, which is adjustably supported on the plate 11 by means of a screw 41, and which engages the contact support 36 to limit its movement towards the plate 11 with the arm 22. The contact supports 30 and 36 being insulated from plate 11, electrical connections are made with these members, by means of terminal portions 42 and 43 at the ends of the portions of these members fixed to the plate.

In accordance with the present invention, means are provided for displacing the switch arm 22 from the contacts 26 and 27, so as to connect resistors, or the like, in the electric circuit of the motor to reduce the voltage supply thereto as the load on the motor is lightened and the motor speed thereby increased. Such means involves the use of a speed responsive mechanism 50, which is connected to the motor shaft 15, and which is operative to exert an outward pressure against arm 22 in proportion to the square of the motor speed and thereby cause arm 22 to rock counterclockwise and to successively disconnect the contact members at successive positions of switch arm 22.

The speed responsive mechanism, here shown, comprises an arm 51, which is pivoted at 52 on a bracket 53 secured to a hub 54 fixed to the shaft 15 by means such as screw 56, and actuated by centrifugal force upon rotation of the shaft to move the switch arm 22 toward the plate 11 against a resilient resistance presented by a spring 57 compressed between the arm 22 and a member 58 mounted on plate 11. As shown in Figure 1, the lower end of the arm 51 extends into a slot 61 in the hub 54 of the bracket 53 into alignment with the axis of shaft 15, and engages a ball 62 carried in an axially extending aperture in the end of the hub 54. The opposite side of the ball engages the head of a stud 66 carried by the arm 22 in alignment with the axis of the shaft 15 but insulated from the arm by plate 67 to which the stud 66 is secured and which in turn is secured to arm 22 by rivets 68 so that the stud 66 lies within an aperture 69 of arm 22. The function of the ball 62, as will be understood, is to transmit an axial force from the arm 51 to the switch arm 22.

The pressure exerted by the arm 51 against the switch arm 22 will be proportionate to the square of the rotational speed of the motor shaft 15, and the movement of these members is controlled by the resistance of the spring 57, and the pressure exerted by the resilient contact support 36. The resistance offered by the spring 57 may be varied by manual adjustment so that displacement of the switch arm 22 at various speeds of the motor may be accurately controlled.

As here shown, the spring 57 is a helical spring which is supported at its ends by spring rests 58 and 59, which are supported, respectively, on the stud 66 and on the enlarged inner end of a screw 71 carried by the plate 11, the spring seat 59 being separated from the arm 22 by means of the strip 67 of insulation.

The compression of the spring 57 may be adjusted by a manual adjustment of the screw 71 which, as shown in Figure 1, is screwed into a plug 72 which is, in turn, screwed into a bushing 73 on the plate 11 and may be locked thereto by a lock nut 74. The screw 71 is held in adjusted position in the plug 72 by means of a nut 76, threaded on the screw 71 and engageable against a spring 77 compressed between the nut 76 and the outer end of the plug 72, nut 76 being secured by a locking nut 78 and a sleeve 79 being provided to limit the range of adjustment in one direction. The position of plug 72 determines the range of speeds within which adjustment by screw 71 is possible, since the latter can be unscrewed only as far as permitted by the contact of its enlarged inner end with the plug 72.

Referring to the embodiment shown in Figure 1, it will now be clear that, upon acceleration of the motor, the switch arm 22 will be displaced away from the contact members 26 and 27 a distance determined by the speed of the motor and the strength of springs 57 and 36 and that, upon the motor attaining the predetermined speed, the switch arm 22 will successively disengage the contacts 26 and 27. The predetermined speed is controlled by the compression of the spring 57 and by resilient contact support 36, the former of which, as was above seen, is subject to manual adjustment, and also by the latitude of movement permitted the contact support 36, which, as above noted, is also subject to manual adjustment. Thus, the apparatus may be set to break the contact between the switch arm 22 and the contact 26 at substantially any desired motor speed.

The breaking and making of the switch contacts which have been described is used to throw into and out of the motor circuit, certain resistors for changing the voltage supply to the motor, in accordance with the amount of load on the motor. The electrical circuit for accomplishing this result is illustrated in Figure 5, wherein two resistors 80 and 81 are connected in the voltage supply circuit to the motor and the switch mechanism, so as to be normally cut out of the motor supply circuit by the switch mechanism at low motor speeds and to be successively thrown into the motor supply circuit at higher motor speeds.

The circuits can be followed by referring to the wiring diagram (Figure 5). When both sets of contacts are closed, the circuit to the motor is completed from one side of the voltage supply line 82 by way of flexible contact support 36, closed contacts 24 and 27, arm 22, closed contacts 23 and 26, lead 83 and motor lead 84. Thus, with both sets of contacts closed the full line voltage is supplied to the motor, the other side of the supply line being connected directly thereto by line 86. When the first contact points 23 and 26 are opened by movement of arm 22 the circuit to the motor is maintained from supply lead 82 by way of member 36, closed contacts 24 and 27, through arm 22 and lead 87 to resistor 80 and to motor lead 84. Thus, with the first contacts 23 and 26 open, one resistor is thrown into the motor circuit. With contacts 24 and 27 also opened by further movement of arm 22, the circuit to the motor is maintained from voltage supply line 82 to line 87, line 88, resistance 81 and resistance 80, in series to motor lead 84. Thus when both sets of contacts are open two resistances in series are thrown into the circuit to thereby further decrease the voltage supplied to the motor.

Preferably, a condenser 89 is connected across the resistors in order to protect the contact elements of the switch against surges of current caused by the making and breaking of these contacts.

The resistors 80 and 81 may be proportioned in size with regard to the size and characteristics of the motor and the variation of the operating load. Usually, the sum of the resistance of these two resistors is selected to reduce the voltage supply to the motor to a point where the no-load speed of the motor is reduced to approximately its full load speed. The resistor 80 may then be of a size which will reduce the motor speed under an average or mean operating load to substantially this same speed. Thus, during starting, the motor is supplied a full line voltage, and, if the motor is sufficiently loaded, the switch contacts will remain closed and the full line voltage retained. If, however, the motor is only subject to a light load, or if some of the load is removed, the motor will accelerate until switch contacts 23 and 26 are opened when resistor 80 is placed in the circuit so as to check the rising motor speed. If the action of resistor 80 is not sufficient, or if further load is removed from the motor and motor continues to accelerate, switch contacts 24 and 27 will be opened and sufficient resistance then placed in the circuit to hold the motor speed to a desired maximum limit.

From the above description it is obvious that movement of contact arm 22 will result whenever the counter-clockwise forces acting against it do not balance the clockwise forces acting against it. In the embodiment of the invention above described, the movement of the switch arm 22 is controlled by two outward forces and one inward force. The main outward force is that exerted by the tip of centrifugal arm 51 and is therefore proportional to the square of the motor speed. The second outward force is that exerted by the flexible contact support 36, which force decreases with outward movement of the switch arm 22. The inward force acting on arm 22 is that exerted by spring 57. This force increases as arm 22 moves outwardly. From the above it is evident that for any set position of the arm 22 the centrifugal force is equal to the force of spring 57 minus the force of spring leaf 36. As arm 22 moves outward the algebraic sum of the forces of spring 57 and spring 36 become greater, therefore the centrifugal force exerted by member 51 must continue to increase if arm 22 is to continue its outward movement to where the second resistance is thrown into the circuit.

A modified form of the invention has been illustrated in Figure 4, wherein means are provided for causing arm 22 to move outwardly to open the second contact, thereby throwing the second resistance in the circuit, without increasing the motor speed. This is accomplished by the addition to the structure illustrated in Figures 1 to 3, which is identified by the same reference numerals in this figure, of an auxiliary spring 90 (Figure 4) which is so arranged as to compensate for the increase of inward pressure exerted by spring 57 and flexible contact support 36 as the arm 22 moves outwardly. This compensation may be such that the summation of the three springs will remain the same regardless of the position of arm 22, or such that the summation will either increase or decrease as switch arm 22 moves outwardly.

Auxiliary spring 90 is tensioned between an ear 91 formed on movable switch arm 22 and a slide 92 adjustably retained on mounting plate 11, by a nut and bolt 93 movable in a vertical slot 94 in plate 11. The slide 92 may, for instance, be adjusted so as to position the axis of spring 90 above the pivotal axis 17 of arm 22 so that initially the force of spring 90 acts to move arm 22 inwardly thereby adding to the force of spring 57. This corresponds to the condition indicated in Figure 6, by line 90, with which arrangement as arm 22 moves outwardly the axis of spring 90 moves toward the pivotal axis 17 thereby reducing its action against arm 22, further outward movement of arm 22 causing the axis of spring 90 to cross the pivotal axis 17 and thereby exert an opposite force which acts to move arm 22 outwardly.

Obviously it is not necessary that the line of action of spring 90 cross the pivotal axis 17 as arm 22 rocks. Its entire action could be to either side thereof so long as its point of attachment to arm 22 is such that its line of action moves rapidly toward or from axis 17 as arm 22 rocks, and so long as the total force exerted by all springs equals the desired value of centrifugal force.

In Figure 6, the pressures that the three springs exert against arm 22 are shown diagrammatically for the positions of arm 22 as it moves counterclockwise. Pressures exerted inwardly against arm 22 are shown above the zero line and those exerted outwardly are shown below the line. Line 57 shows the increasing effect of spring 57. Line 36 shows the decreasing outward pressure exerted by flexible support 36. The vertical portion of this line indicates the point at which flexible support 36 comes to rest against stop 40 (Figure 3), and it will therefore exert no force when arm 22 moves outwardly beyond this point, at which the second contact starts to open. Line 90 represents the compensating spring 90. The line R shows the resultant of the three springs. Briefly, the governing will function as follows: With the motor at rest the resultant spring pressure is shown at A (Figure 6), as the motor accelerates the centrifugal member 51 exerts an increasing outward pressure against switch arm 22. When this pressure slightly exceeds the spring pressure shown at point A, arm 22 will move outwardly opening the contacts 23 and 26 and throwing in the first resistance 80 (Figure 5). The governing at this point depends on the motor load, and will function in one of the four following manners:

*Case 1.*—If the motor load is very light the voltage reduction resulting from throwing in the first resistance will not be sufficient and the motor will continue to accelerate but at a lower rate;

*Case 2.*—If the motor load is a little greater the speed may remain constant;

*Case 3.*—If the load is still greater the motor will decelerate at a low rate; while

*Case 4.*—If the load is near the maximum the motor will decelerate rapidly.

Analyzing the first case with very light load, the centrifugal force of arm 51 will continue to increase, thereby increasing the outward pressure against arm 22. By following the resultant spring pressure curve R, it will be noted that the inward pressure exerted by the combined springs is decreasing until point C is reached; therefore arm 22 is unbalanced outwardly and will continue to move outwardly. Movement of arm 22 beyond point C will cause an increase of inward pressure up to point B. In the present illustration the combined spring pressure at point B is the same as that at point A, and since the outward pressure against arm 22 has continued to increase, the arm 22 will continue to move outwardly and cause contacts 24 and 27 (Figure 4) to open and throw in the second resistance 81 which can be sufficiently larger to cause the motor to decelerate rapidly enough so that the inward force of the springs will overbalance the outward force exerted by centrifugal member 51 and cause arm 22 to move inwardly until contacts 24 and 27 again close to shunt out the second resistance 81, the governor will thus operate on the points 24 and 27 to maintain a practically constant speed, the same speed as that at which arm 22 first started to move away from the first contact point 26.

Case 2, where the speed is constant after opening the first contact, will function the same as Case 1 in regard to motor speed, since centrifugal force will remain greater than corresponding spring pressure until 81 is thrown into circuit. In each of these cases the governor settles down to govern at point B (Figure 6).

Case 3, where the motor decelerates very slowly, arm 22 will continue to open until leaf 36 engages stop 40, at which time the centrifugal force will have a value intermediate between that represented by point B and that represented by point C, whereupon the motor will continue to decelerate until the outward force due to centrifugal member 51 is reduced below point C. Arm 22 will then return inwardly under an increasing spring pressure until contact points 23 and 26 again make contact and cause the motor to again accelerate until the outward pressure again becomes greater than the pressure at point A. This cycle will continue with the speed varying between the limits necessary to unbalance the forces against arm 22 to cause the contacts 23 and 26 to make and break. It is obvious that the vertical portion of the resultant line R between points B and C can be made relatively short, thereby holding the speed fluctuation under Case 3 very small.

In Case 4, with a very heavy load the motor decelerates at a rate such that the outward pressure on arm 22 decreases faster than the inward pressure of the spring against arm 22 decreases, thus the speed will be controlled within very close limits at a point which gives an outward centrifugal pressure approximately equal to that at point A.

It will be observed that this arrangement will result in the motor governing at exactly the same speed when governed by contact points 23 and 26 under heavy load as when governed by contact points 24 and 27 under light load, because of the fact that the resultant spring pressure against ball 62, and therefore the centrifugal force required to break the contacts is exactly the same at point A as at point B (Figure 6). A slight loss of speed occurs, however, in changing from the latter to the former. Obviously, by changing the strength of spring 90 (the slope of line 90, Figure 6), or by changing the pressure that leaf 36 is capable of exerting against arm 22 (length BC, Figure 6), or by any of several other similar changes, either the light load or heavy load point may be made higher in governing speed than the other, instead of establishing the two at identical speeds as in the above illustration.

An alternate arrangement of resistors and electrical circuits is shown in Figure 7. This arrangement accomplishes the same purpose as the arrangement previously described. In this arrangement the two resistors are arranged in parallel connection such that the resultant parallel resistance is thrown into the supply circuit to the motor when the first contacts 23 and 26 are opened. When the second contacts 24 and 27 are opened the circuit to one of the resistors is opened leaving only one resistor in the circuit and thereby further increasing the resistance in the supply circuit to the motor. This circuit can be followed in Figure 7. When both contacts are closed the circuit from the voltage supply line 96 to the motor is completed by way of lead 97, arm 22, contacts 23 and 26, and lead 98 to the motor lead 99. With the first contacts 23 and 26 open, the circuit from supply line 96 to the motor is maintained by way of leads 97, arm 22, contacts 24 and 27, lead 101 to one of the parallel resistances 103, and also from the supply line 97 by way of leads 104 and 105 through the other parallel resistance 106 to the motor lead 99. If both contacts are open the current passes from lead 97 to leads 104 and 105 to a greater resistance 106 and to lead 99, thus cutting out the lesser resistance 103. This second arrangement has the advantage over the previous arrangement in that when the first set of contacts 23 and 26 are closed the current to the motor does not have to pass through the second set of contacts 24 and 27. A further advantage of the arrangement shown in Figure 7 is that two resistances are thrown into circuit when the greater amount of heat must be dissipated, and one resistance when a less amount of heat is to be dissipated, while the reverse condition exists in the Figure 5 arrangement. A greater amount of heat is generated with a lower resistance in circuit, and since resistance 80 (Figure 5) is thrown into the circuit alone, it must dissipate a greater amount of heat than is dissipated when resistances 80 and 81 are connected in series. In the Figure 7 arrangement, on the other hand, resistances 103 and 106 are connected in parallel when both are in circuit, and therefore set up a lower resistance than is set up when resistance 196 alone is in circuit. Hence with this arrangement there will be less heat developed when one resistance is in circuit than when both resistances are in circuit, thus making possible the use of more economically sized resistances than is possible with the Figure 5 arrangement.

One of the important applications of the present invention is the use of the same in controlling the motor speed in various types of operating equipment subject to rapid and frequent changes in the load on the motor. Typical of such equipment in mind, is office and business machinery such as electrically operated adding machines and calculators, where a great variance of load is applied on the motor, as a result of the use of various numbers or combinations of the keys and associated counting mechanisms. However, the invention has a relatively wide application, as will be apparent to those skilled in the art. Also, although specific embodiments of the invention have been described herein, it will be apparent to those skilled in the art to which the invention appertains, that many modifications thereof are possible, and it is to be understood that the invention is not to be considered as restricted to the forms shown except insofar as is necessitated by the prior art and by the spirit of the appended claims.

We claim:

1. In a device of the class described, a rotatable member having a lever pivotally mounted thereon and movable by centrifugal force effective during rotation of said member, a switch arm displaceable by said lever and provided with a plurality of electrical contact points, resilient means arranged to furnish progressively increasing resistance to movement of said switch arm by said lever, resilient means arranged to furnish progressively decreasing assistance to movement of said switch arm by said lever and including an electrical contact point engaging one of the aforesaid contact points on said switch arm, and a fixed electrical contact point engaging the other of the aforesaid contact points on said switch arm.

2. In a device of the class described, a rotatable member having a lever pivotally mounted thereon and movable by centrifugal force effective during rotation of said member, a switch arm displaceable by said lever and provided with a plurality of electrical contact points, a fixed electrical contact point engageable with one of the aforesaid contact points, a spring arranged to furnish progressively increasing resistance to movement of said switch arm by said lever, a first resilient means arranged to furnish progressively decreasing assistance to movement of said switch arm by said lever and including an electrical contact point engageable with one of the aforesaid contact points on said switch arm, and a second resilient means comprising a spring positioned on said arm and positioned so as to produce a rocking moment first on one side and then on the other side of the pivotal mounting thereof in progressive angular positions of said arm and to thus first oppose and then aid displacement of said arm by said lever as such progressive angular displacement takes place, whereby the total resistance offered to displacement of said arm by said lever remains substantially constant during angular displacement of said arm.

3. A device of the class described comprising a rotatable member having a lever pivotally mounted thereon and movable by centrifugal force effective during rotation of said member, a pivotally mounted switch arm displaceable by said lever, and switch means operable by displacement of said arm; characterized by the provision of resilient means opposing displacement of said arm by said lever in combination with a spring positioned on said arm so as to produce a rocking moment first on one side and then on the other side of the pivotal mounting thereof in progressive angular positions of said arm and to thus first oppose and then aid displacement of said arm by said lever as such progressive angular displacement takes place, whereby the total resistance offered to displacement of said arm by said lever remains substantially constant during angular displacement of said arm.

4. A device of the class described comprising a rotatable member having a lever pivotally mounted thereon and movable by centrifugal force effective during rotation of said member, a pivotally mounted switch arm displaceable by said lever, and switch means operable by displacement of said arm; characterized by the provision of resilient means opposing displacement of said arm by said lever in combination with a spring positioned on said arm adjacent the pivotal mounting thereof so as to produce a rocking moment which changes rapidly with changes in the angular position of said arm, whereby the total resistance offered to displacement of said arm by said lever remains substantially constant during angular displacement of said arm.

LAWRENCE E. WARNER.
HAROLD T. AVERY.